Aug. 14, 1956   W. HACKENBERG   2,759,155
ELECTRICAL CAPACITOR AND FILTER UNIT
Filed June 10, 1952

INVENTOR
WERNER HACKENBERG
BY
ATTORNEY

United States Patent Office 2,759,155
Patented Aug. 14, 1956

2,759,155

ELECTRICAL CAPACITOR AND FILTER UNIT

Werner Hackenberg, Heidenheim, Germany, assignor to Siemens & Halske Aktiengesellschaft, Munich, Germany, a corporation of Germany Application June 10, 1952, Serial No. 292,657

Claims priority, application Germany June 28, 1951

3 Claims. (Cl. 333—79)

This invention relates to an electrical capacitor and filter device adapted to be mounted as a unit on the wall of high-frequency apparatus and the like.

The invention proposes to use in the new device at least one ceramic capacitance disk having a preferably centrally or concentrically disposed passage and two metallic electrically separated layers adhering thereto. One of these layers may cover one side of the ceramic disk and also the circumferential surface thereof, and the other layer may cover the opposite side as well as the axially extending wall of the centrally or concentrically extending passage.

The ceramic capacitance disk made as noted above may be employed as a universal structural element for making capacitors and filters or the like of different types and for different specific purposes. For example, the capacitance disk may be positioned inside a casing which may be a tubular metallic casing, with the side carrying the metallic layer which is continuous with the peripheral or circumferential layer facing axially outside and forming an electrically conductive connection with the metallic casing. Such electrical connection may be secured either by soldering or by peening the metallic casing over the disk peripherally thereof. In the central passage of the disk may be disposed a boltlike element which establishes electrically conductive connection with the metallic layer on the inside wall of the passage, which layer is continuous with the metallic layer on the other side of the disk. This connection is in suitable manner secured by soldering, riveting or by screw thread or the like.

In accordance with another object of the invention, a ceramic capacitance disk provided with metallic layers as indicated above may be symmetrically disposed at each of the opposite ends of a tubular casing, for example, a metallic casing, and connected by an axially extending boltlike member. The metallic layers of the capacitance disks which face axially outwardly are in such a structure electrically connected with the casing wall. Between the two disks inside of the casing may be disposed other structural elements, for example, a wrapped capacitor or a choke coil or the like. These latter elements may be interconnected with the metallic layers of the ceramic capacitance disks so as to obtain a filter which may be used, for example, for interference protection in high-frequency operation.

Still another object of the invention is to provide a capacitor battery by disposing a plurality of the ceramic capacitance disks carrying the metallic layers side by side within a suitable casing. These disks may in such a case be disposed so that identically placed metallic layers thereof are alternately in contact. The capacitances of the disks are in such a case connected in parallel.

The various objects and features will appear from the detailed description which will presently be rendered with reference to the accompanying drawings showing in partial sectional diagrammatic views embodiments of the invention. In these drawings, Fig. 1 shows a simple example of a capacitor comprising a single ceramic capacitance disk carrying metallic layers and disposed in a tubular metallic casing;

Fig. 2 indicates a plurality of such capacitance disks disposed in a metallic casing to form a capacitor battery;

Fig. 3 illustrates an embodiment employing two ceramic capacitance disks with their metallic layers disposed in a metallic casing and a wrapped capacitor positioned between the disks and forming a filter therewith;

Fig. 4 indicates the filter circuit that may be made by using the structure according to Fig. 3;

Fig. 5 represents an embodiment similar to the one shown in Fig. 3, but using a choke or induction coil between the two capacitance disks;

Figure 1:
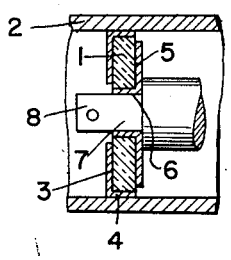

The capacitor shown in Fig. 1 comprises a circular disk 1 of ceramic material. This disk is disposed within the tubular metallic casing 2. It may be disposed at one end of the casing and may thus form the terminal end thereof. The disk carries on the outside the metallic layer 3 which extends continuously with the peripheral or circumferential layer portion 4. On the inside of the disk is provided a similar metallic layer 5 which extends at 6 inside the central or concentric passage 7. The metallic layers such as 3/4 and 5/6 and similar layers shown in other embodiments are formed as adhesive layers which are inseparably connected with the corresponding ceramic carrier, for example, by sintering or other suitable form of metallizing. The casing 2 is conductively connected with the metallic layer 3/4. The connection may be secured by soldering or by peening over the casing in overlapping engagement with the disk peripherally thereof. In order to provide in the latter case a secure contact, a good electrical conductive material may be disposed between the casing wall and the disk peripherally thereof such, for example, as a flexible metallic tubing or electrically conductive rubber or rubberlike substance. Disposed within the passage 7 is a metallic boltlike member 8 which is in conductive engagement with the inner metallic layer 5/6 by engagement with the axially extending layer portion 6. The boltlike member 8 may be secured in suitable manner by soldering, riveting or by screw thread or the like. The necessary electrical terminals are suitably connected to the casing 2 and to the boltlike member 8.

Figure 3:
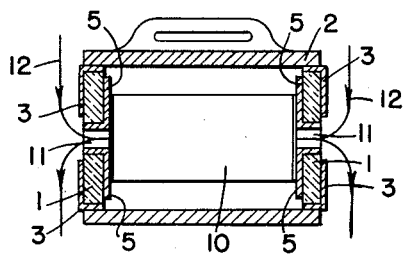

The above described structure may be modified (as is also indicated in Fig. 3) by disposing at the other end of the tubular casing 2 a ceramic capacitance disk similar to the disk 1 having like metallic lyers 3/4 and 5/6 and terminating the casing at such other end in a position corresponding to the position of the disk 1, as shown in Fig. 1, for example, with the metallic layer 3 facing axially outwardly.

The materials which are suitable for the capacitance disks are particularly those having a titanite base, for example, barium titanite ($BaTiO_3$). Such material has a high dielectric constant, for example, $\delta = 3000$. In the case of a capacitance disk having an outer diameter of 30 mm., a passage measuring 6 mm. in diameter, and being 5 mm. thick will, for example, furnish a capacitance value C=about 2500 pf. This value is suitable as a nonsymmetrical contact protection capacitance in the case of high-frequency disturbance.

Figure 2:
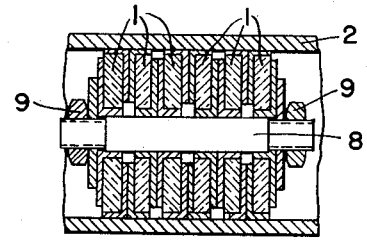

The embodiment shown in Fig. 2 comprises again a tubular metallic casing 2 containing a plurality of ceramic capacitance disks 1, each disk carrying the metallic layers, as before, the disks being stacked on the boltlike member 8. The disks are positioned so that identical metallic layers of adjacent disks are in contact. The capacitances of the various disks are thus in parallel and the result is a structure having correspondingly multiplied capacitance. The disks are held in position by the nuts 9. The metallic layers of the disks, which extend peripherally thereof, are in electrically conductive engagement with the metallic casing, and the metallic layers extending inside of the central passages of the disks are similarly in electrically conductive engagement with the bolt 8. Terminals may suitable be connected to the casing and to the boltlike axially extending member. The casing and the boltlike member may be concentrically uniformly connected with and secured to the corresponding metallic layers by high-frequency or by ultrasonic soldering.

In the structure according to Fig. 3, there are disposed at the opposite ends of the tubular metallic casing 2 ceramic capacitance disks 1 made as already described with reference to Fig. 1. Between these disks, inside the casing, is positioned a wrapped capacitor 10. The two metallic layers of this capacitor 10 are at the opposite ends provided with a metallic coating 11 which may be sprayed thereon. These coatings are in suitable manner, for example, by soldering, electrically conductively connected with the inner metallic layers 5 of the disks 1. The wrapped capacitor is thus securely held in position. The outer metallic layers 3 are connected with the casing 2. The arrangement of parts is symmetrical; that is, the capacitance values of the two disks are identical. The electrical connections are made by the wires 12. Boltlike axially extending members, as discussed with reference to the prior figures, may be used in place of the terminal wires.

Figure 4:
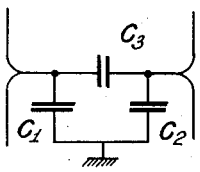

The embodiment according to Fig. 3 is particularly suitable for use as a filter in high-frequency operation. An example of a circuit is indicated in Fig. 4, wherein $C_1$ and $C_2$ are the capacitances of the disks 1, and $C_3$ is the wrapped capacitor 10. The operating current flows in this circuit along the terminal wires 12; over the capacitors of the disks 1 flows the shunted high-frequency interference current.

Another form of filter chain according to the invention is indicated in Fig. 5. This structure differs from the one shown in Fig. 3 mainly in the use of a choke coil 13 instead of a wrapped capacitor. The choke coil may be of the kind provided with an iron core, for example, a ferrite core.

Figure 6:
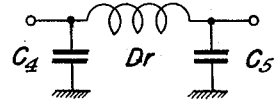
Fig. 6 is an example of a circuit resulting from the structure, Fig. 5.

An example of an electrical circuit resulting from the structure Fig. 5 is indicated in Fig. 6, wherein $C_4$ and $C_5$ are the capacitances of the disks 1 which are grounded, and $D_r$ is the inductance of the choke 13.

Figure 7A:
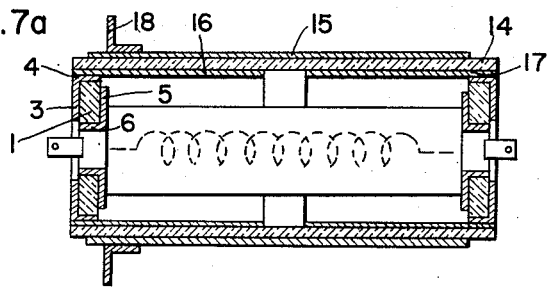
Fig. 7a illustrates on an enlarged scale a structure similar to the one shown in Fig. 7 but using terminal disks made of ceramic material and provided with metallic layers.
Figure 7:
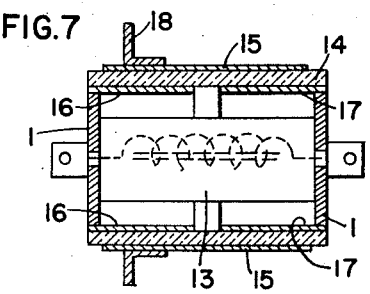
Fig. 7 illustrates an embodiment comprising a ceramic tubular casing carrying metallic layers and two terminal disks as well as a choke or the like disposed between the disks.

The embodiment according to Fig. 7 employs, in place of a metallic casing, a tubular casing 14 made of ceramic material. Circumferentially of this casing is disposed an adhesive metallic layer 15, and on the inside are disposed separate similarly adhesive metallic layers 16 and 17. At each of the opposite ends of the casing is disposed a metallic disk 1 and between these disks is disposed an electrical element, for example, as shown, a choke coil 13. The metallic disks 1 are respectively connected with the inner layers 16 and 17 carried by the tubing or casing 14. There are thus two capacitors formed by the inner layers 16 and 17 in cooperation with the outer layer 15. A wrapped capacitor such as 10 in Fig. 3, or the like, may of course take the place of the coil 13.

Each of the disks in Fig. 7 may be a ceramic capacitance disk 1 as indicated in Fig. 7a. Each such disk is provided with an outer metallic layer 3 connected with the inner metallic layers 16 and 17 of the tubular casing 14 and with an inner layer 5 suitably connected with an end of the choke coil 13. The metallic layers are in this manner connected so that the capacitances become additive. Parts not specifically mentioned with reference to Fig. 7a correspond to like numbered parts shown in Fig. 7.

Figure 8:
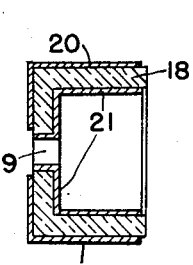
Fig. 8 is a view of a potlike structure comprising a ceramic member carrying metallic layers.

The disklike capacitance element may take the form of a potlike element, as shown in Fig. 8, comprising a potlike ceramic body 18 provided with a passage 19. On the outside is disposed the metallic layer 20 and on the inside the metallic layer 21. The latter extends into the central passage 19. It is possible of course to have the layer 20 extend into the passage 19 and the layer 21 spaced therefrom. The potlike structure may at its open right end be closed by a capacitance disk, as shown in Fig. 1, and electrical elements may be positioned inside thereof, as discussed in connection with Figs. 4–7.

Figure 9:
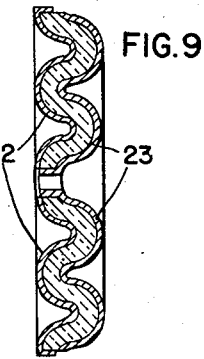
Fig. 9 indicates a portion of a ceramic capacitance disk made in undulating form and carrying metallic layers which may be employed in place of the respective capacitance disks in any of the embodiments shown in the remaining figures.

The surface of the ceramic capacitance disk may be increased by giving it suitable form, for example, the undulating form shown in Fig. 9. Numerals 22 and 23 indicate the metallic layers. The desired form may be obtained by any suitable process, for example, by pressing or grinding. Any one of the disks indicated in the various embodiments may receive this form.

The capacitor or filter unit produced in accordance with the invention may be built into or mounted directly on the wall of the housing of a high-frequency apparatus. The corresponding unit may for this purpose be provided with a mounting flange such as indicated in Figs. 5 and 7 by the numeral 18.

The ceramic capacitance disks need not be circular in shape; they may be of any desired and suitable form, for example, rectangular. Polygonal shapes give the additional advantage of fixing the respective structures angularly against rotation in their correspondingly shaped tubular casings.

Changes may be made within the scope and spirit of the appended claims.

I claim:

1. As an article of manufacture, an electrical high frequency capacitor forming a completely assembled unit adapted to be mounted on a wall of the housing of a high frequency apparatus, said unit comprising a tubular ceramic casing, a first continuous metallic layer carried by said casing on the outside thereof, second and third metallic layers carried by said casing on the inside thereof, said second and third metallic layers extending respectively from the opposite ends of said casing axially inwardly and stopping short of the center thereof to form a central gap, said first continuous metallic layer carried on the outside of said casing being opposite portions of said second and third metallic layers carried on the inside of said casing, a disklike member at each end of said casing for closing the corresponding ends thereof to form a chamber extending axially therebetween from end to end of said casing, a central aperture formed in each of said disklike members, a choke coil disposed in said chamber between said disklike members axially of said casing forming with said capacitor a filter unit, terminal means for said choke coil extending axially outwardly from each disklike member for establishing connection with said choke coil through the central aperture of the corresponding disklike member, said terminal means being electrically coupled to the respective metallic layers carried by said casing inside thereof, and a flangelike metallic mounting member disposed on the outside of said ceramic casing in conductive engagement with said first continuous metallic layer thereon for mounting said capacitor as a unit on the wall of a high frequency apparatus.

2. The article of manufacture as defined in claim 1, wherein said disklike members are metallic members which are respectively peripherally in engagement with the metallic layer which extends axially inwardly from the corresponding end of said tubular ceramic casing.

3. The article of manufacture as defined in claim 1, wherein at least one of said disklike members is a ceramic member carrying a metallic layer which is in conductive engagement with one of said metallic layers carried by said casing.

References Cited in the file of this patent

UNITED STATES PATENTS

| | | |
|---|---|---|
| 2,163,775 | Conklin | June 27, 1939 |
| 2,405,515 | Neyzi | Aug. 6, 1946 |
| 2,430,433 | Minnium | Nov. 4, 1947 |
| 2,464,377 | Cohen | Mar. 15, 1949 |
| 2,626,318 | Torre | Jan. 20, 1953 |
| 2,668,946 | Bennett | Feb. 9, 1954 |

FOREIGN PATENTS

| | | |
|---|---|---|
| 660,890 | Germany | May 12, 1938 |